United States Patent
Khomenko et al.

(10) Patent No.: US 11,482,025 B2
(45) Date of Patent: Oct. 25, 2022

(54) ELECTRONIC DEVICE AND CONTROL METHOD THEREOF

(71) Applicant: SAMSUNG ELECTRONICS CO., LTD., Suwon-si (KR)

(72) Inventors: Viacheslav Khomenko, Kyiv (UA); Kostiantyn Bokhan, Kharkov (UA); Olga Radyvonenko, Kyiv (UA); Vadym Osadchiy, Brovary Kyiv Region (UA); Oleksandr Viatchaninov, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/040,694

(22) PCT Filed: May 29, 2018

(86) PCT No.: PCT/KR2018/006080
§ 371 (c)(1),
(2) Date: Sep. 23, 2020

(87) PCT Pub. No.: WO2019/194356
PCT Pub. Date: Oct. 10, 2019

(65) Prior Publication Data
US 2021/0012101 A1    Jan. 14, 2021

(30) Foreign Application Priority Data

Apr. 2, 2018    (KR) .......................... 10-2018-0038256

(51) Int. Cl.
*G06V 30/32*    (2022.01)
*G06K 9/62*    (2022.01)
(Continued)

(52) U.S. Cl.
CPC ............ *G06V 30/36* (2022.01); *G06K 9/6256* (2013.01); *G06V 10/22* (2022.01); *G06V 10/50* (2022.01); *G06V 30/333* (2022.01)

(58) Field of Classification Search
None
See application file for complete search history.

(56) References Cited

U.S. PATENT DOCUMENTS 5,515,455 A * 5/1996 Govindaraju ...... G06K 9/00865
382/101
6,115,506 A * 9/2000 Koshinaka ........... G06K 9/3283
382/177

(Continued)

FOREIGN PATENT DOCUMENTS

KR    10-2013-0082223 A    7/2013
KR    10-2016-0102690 A    8/2016
WO    2016/197381 A1    12/2016

OTHER PUBLICATIONS

Moysset, B., Bluche, T., Knibbe, M., Benzeghiba, M. F., Messina, R., Louradour, J., & Kermorvant, C. (Sep. 2014). The A2iA multi-lingual text recognition system at the second Maurdor evaluation. In 2014 14th International Conference on Frontiers in Handwriting Recognition (pp. 297-302). IEEE. (Year: 2014).*

(Continued)

*Primary Examiner* — David Perlman
(74) *Attorney, Agent, or Firm* — Sughrue Mion, PLLC

(57) ABSTRACT

An electronic device is disclosed. The electronic device comprises a storage unit for storing a training model of a multi-dimensional long short-term memory (MDLSTM), and a processor for acquiring an image including at least one of handwritten text and printed text, identifying each text line region in the image through image processing, and (Continued)

recognizing text included in the each identified text line region, on the basis of the training model.

7 Claims, 10 Drawing Sheets

(51) Int. Cl.
*G06V 10/22* (2022.01)
*G06V 10/50* (2022.01)

(56) References Cited

U.S. PATENT DOCUMENTS

| | | | |
|---|---|---|---|
| 8,005,294 | B2 | 8/2011 | Kundu et al. |
| 8,559,723 | B2 | 10/2013 | Miljanic et al. |
| 8,934,716 | B2 | 1/2015 | Yoon et al. |
| 9,263,036 | B1 | 2/2016 | Graves |
| 9,465,985 | B2 | 10/2016 | Xia et al. |
| 10,423,852 | B1* | 9/2019 | Sarraf .................. G06K 9/6267 |
| 2011/0229036 | A1* | 9/2011 | Reffle ...................... G06K 9/03 382/182 |
| 2016/0210551 | A1 | 7/2016 | Lee et al. |
| 2016/0247064 | A1 | 8/2016 | Yoo et al. |
| 2016/0378195 | A1 | 12/2016 | Lefebvre |
| 2017/0076196 | A1 | 3/2017 | Sainath et al. |
| 2017/0091168 | A1 | 3/2017 | Bellegarda et al. |
| 2017/0091597 | A1 | 3/2017 | Wolfram et al. |
| 2017/0140240 | A1 | 5/2017 | Socher |
| 2018/0005082 | A1 | 1/2018 | Bluche |
| 2018/0146232 | A1* | 5/2018 | Perng .................. H04N 21/482 |

OTHER PUBLICATIONS

Messina, R., & Louradour, J. (Aug. 2015). Segmentation-free handwritten Chinese text recognition with LSTM-RNN. In 2015 13th International conference on document analysis and recognition (icdar) (pp. 171-175). IEEE. (Year: 2015).*

Bluche, T., Louradour, J., Knibbe, M., Moysset, B., Benzeghiba, M. F., & Kermorvant, C. (Apr. 2014). The a2ia arabic handwritten text recognition system at the open hart2013 evaluation. In 2014 11th IAPR International Workshop on Document Analysis Systems (pp. 161-165). IEEE. (Year: 2014).*

Lu, S. J., Li, L., & Tan, C. L. (Sep. 2007). Identification of Latin-based languages through character stroke categorization. In Ninth International Conference on Document Analysis and Recognition (ICDAR 2007) (vol. 1, pp. 352-356). IEEE. (Year: 2007).*

Graves et al., "Offline Handwriting Recognition with Multidimensional Recurrent Neural Networks," 2008 (total 8 pages).

International Search Report dated Jan. 10, 2019 (PCT/ISA/210) issued by the International Searching Authority for International Application No. PCT/KR2018/006080.

Written Opinion dated Jan. 10, 2019 (PCT/ISA/237) issued by the International Searching Authority for International Application No. PCT/KR2018/006080.

Communication dated Jan. 12, 2021 by the European Patent Office in counterpart European Patent Application No. 18913212.9.

* cited by examiner

FIG. 4 pleasure and pain will give you a complete account to the system ~410 pleasure and pain will give you a complete account to the system ~420 pleasure and pain will ~430

ELECTRONIC DEVICE AND CONTROL METHOD THEREOF

TECHNICAL FIELD

The disclosure relates to an electronic apparatus for recognizing text and a method of controlling thereof. More particularly, the apparatus relates to a technique for recognizing text based on an artificial neural network.

BACKGROUND ART

A technology for recognizing text that is not typed directly on an electronic apparatus has existed in related art.

However, the related art had a problem in correctly recognizing handwritten text or slanted text.

The text recognition technology based on convolutional neural network (CNN), a kind of the artificial intelligence technology, also had a problem of not properly recognizing overlapping characters or handwritten text.

Accordingly, there was a need for a technology capable of accurately and quickly recognizing various types of text including handwritten text.

DETAILED DESCRIPTION OF THE INVENTION

Technical Problem

The disclosure is in accordance with the need described above, and is to provide an electronic apparatus capable of accurately and quickly recognizing text included in an image based on the long-short term memory (LSTM), a kind of recurrent neural network (RNN), and a method of controlling thereof.

Technical Solution

According to an embodiment of the disclosure, the electronic apparatus includes a storage configured to store a training model of multi-dimensional long short-term memory (MDLSTML), and a processor configured to acquire an image including at least one of handwritten text and printed text, identify each of text line regions in the image through image processing, and recognize text included in the each identified text line region based on the training model.

The processor may be configured to binarize text region in the image and perform the image processing by correction processing with respect to the binarized text region.

The correction processing may include at least one of removal of a slope, height standardization and skeletonization with respect to the text region.

The processor may be configured to identify a region including the identified text line as a plurality of vertical blocks, and calculate a probability of a character estimated from each of the vertical blocks based on a pixel value of each vertical block.

The processor may be configured to combine an existence probability of a first character in a first vertical block, an absence probability of the first character in the first vertical block, an existence probability of a second character in a second vertical block, and an absence probability of the second character in the second vertical block to calculate a plurality of probabilities in which at least one of the first and second characters are included in text line region.

The processor may be configured to apply a token passing decoding and a preset language model to the plurality of calculated probabilities and acquire text recognized in the text line region.

The apparatus may further include a camera and a display, wherein the image including at least one of the written text and printed text refers to an image obtained by the camera or a handwritten image input on the display.

The processor may be configured to identify a function related to the recognized text and perform the identified function.

A method of controlling an electronic apparatus storing a training model of a multi-dimensional long short-term memory (MDLSTM), the method includes acquiring an image including at least one of handwritten text and printed text, identifying each of text line regions in the image through image processing, and recognizing text included in the each identified text line region based on the training model.

The identifying each of the text line regions may include binarizing text region in the image and performing the image processing by correction processing with respect to the binarized text region.

The correction processing may include at least one of removal of a slope, height standardization and skeletonization with respect to the text region.

The method may further include identifying a region including the identified text line as a plurality of vertical blocks, and calculating a probability of a character estimated from each of the vertical blocks based on a pixel value of each vertical block.

The calculating the probability may include combining an existence probability of a first character in a first vertical block, an absence probability of the first character in the first vertical block, an existence probability of a second character in a second vertical block, and an absence probability of the second character in the second vertical block to calculate a plurality of probabilities in which at least one of the first and second characters are included in text line region.

The recognizing the text may include applying a token passing decoding and a preset language model to the plurality of calculated probabilities and acquiring text recognized in the text line region.

The method may further include identifying a function related to the recognized text and performing the identified function.

Effect of the Invention

As described above, according to various embodiments of the disclosure, printed text, handwritten text, and text included in an image photographed by a camera can be quickly and accurately recognized through text recognition technology through the LSTM, thereby providing convenience for a user.

BRIEF DESCRIPTION OF DRAWINGS

FIG. 4 is a view illustrating an operation of identifying each of text lines region according to an embodiment of the disclosure;

BEST MODE FOR IMPLEMENTING THE DISCLOSURE

[Mode for Implementing the Disclosure]

Figure 1:
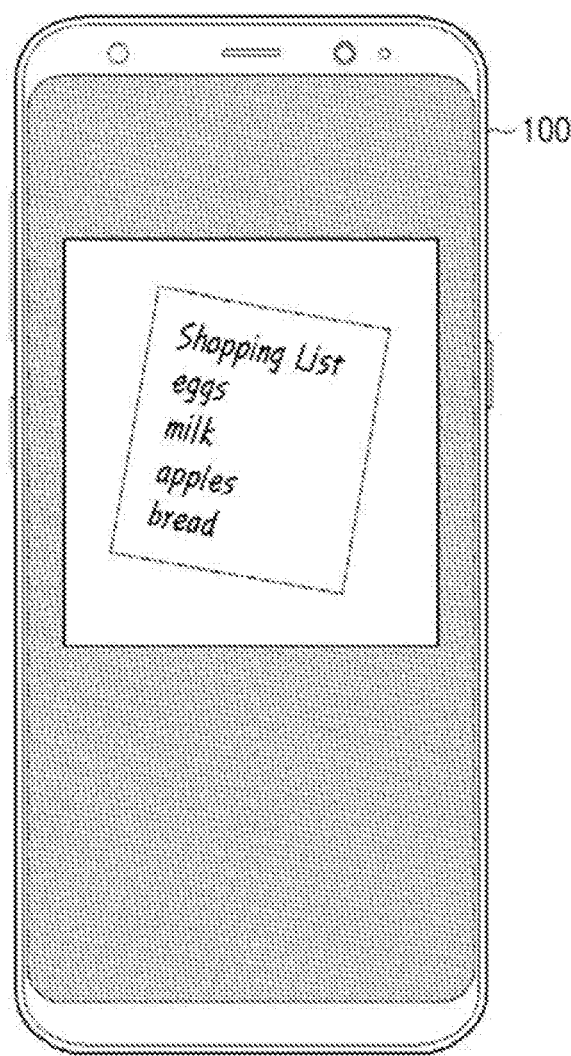
FIG. 1 is a view illustrating an electronic apparatus in which an image including text is input according to an embodiment of the disclosure.

Below, exemplary embodiments will be described in detail with reference to the accompanying drawings. In describing exemplary embodiments, detailed description of relevant known functions or components may be omitted if it would obscure the description of the subject matter. In addition, the exemplary embodiments may be changed in various forms, and therefore, the technical scope is not limited to the following exemplary embodiments. Rather, these exemplary embodiments are provided to make the disclosure thorough and complete.

Unless explicitly described otherwise, the term 'including' will be understood to imply the inclusion of a component, but not the exclusion of any other components. Further, various elements and regions in the drawings are schematically drawn. Therefore, the technical ideas are not limited by a relative size or interval drawn in the accompanying drawings.

Also, the expression "at least one of A, B and C" may mean "A", "B", "C", "A and B", "A and C", "B and C" or "A, B and C".

Hereinafter, the invention will be described in greater detail with reference to the attached drawings.

FIG. 1 is a view illustrating an electronic apparatus in which an image including text is input according to an embodiment of the disclosure.

The electronic apparatus 100 may be implemented as a smartphone capable of recognizing text from an image containing text, but is not limited thereto, and may also be implemented as a laptop computer, tablet, PC, camera, or the like.

The text included in the image may be at least one of handwritten text and printed text. The handwritten text may be handwritten typed text, and the printed text may be printed typed text.

According to one embodiment of the disclosure, the electronic apparatus 100 may quickly and correctly recognize the text included in the image based on the long-short term memory (LSTM), a type of recurrent neural network (RNN). Hereinafter, various embodiments of the disclosure will be described in greater detail with reference to the drawings.

The RNN refers to cyclic neural network and is a kind of deep learning model for learning data that changes over time, such as time series data. The LSTM is a kind of RNN to solve a vanishing gradient problem of RNN by adding cell-state to a hidden layer stage of the RNN. The vanishing gradient problem is a problem in which a learning ability decreases as a gradient gradually decreases during back-propagation when a distance between related information and a point where the information is used is far from the RNN.

Figure 2A:
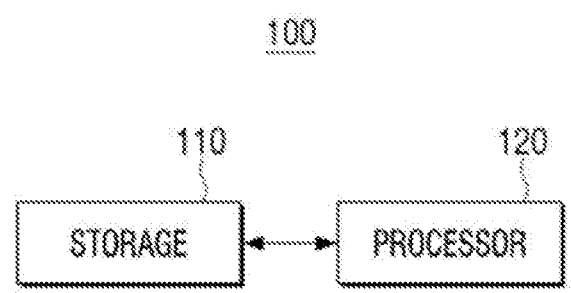
FIGS. 2A and 2B are block diagrams illustrating a configuration of an electronic apparatus according to an embodiment of the disclosure.
Figure 2B:
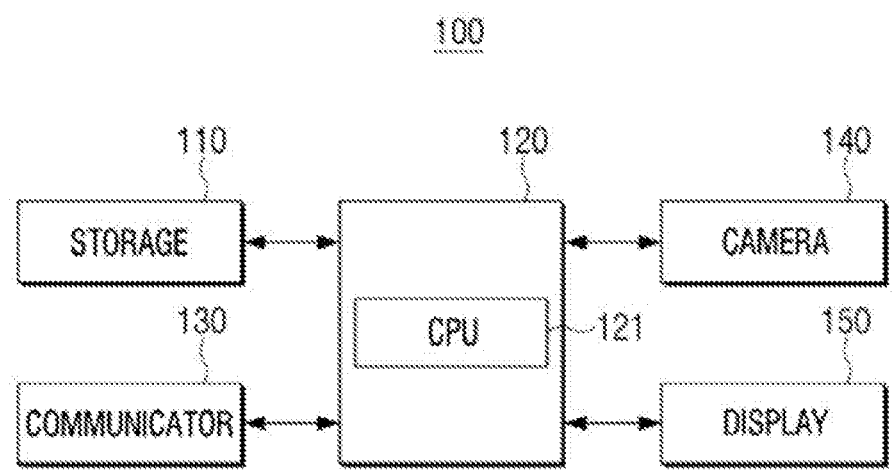

FIGS. 2A and 2B are block diagrams illustrating a configuration of an electronic apparatus according to an embodiment of the disclosure.

Referring to FIG. 2A, the electronic apparatus 100 includes a storage 110 and a processor 120.

The storage 110 may store various data, programs or applications which are used to drive and control the electronic apparatus 100. The storage 110 may store a control program for controlling the electronic apparatus 100 and the processor 120, an application originally provided by a manufacturer or downloaded from the outside, databases, or related data.

In particular, the storage 110 may store a training model of multi-dimensional long short-term memory (MDLSTM). Also, the storage 110 may store an image captured by a camera or captured on the screen of the electronic apparatus 100. Since the MDLSTM method is a related art, a detailed description is omitted.

The processor 120 may control the overall operation of the electronic apparatus 100.

According to an embodiment, the processor 120 may be implemented as a digital signal processor (DSP) processes digital signals, a microprocessor, or a time controller (TCON), but is not limited thereto, and may include one or more of central processing unit (CPU), micro controller unit (MCU), micro processing unit (MPU), controller, application processor (AP), communication processor (CP), and ARM processors, or may be defined as corresponding terms. Also, the processor 120 may be implemented by a system on chip (SoC) with a built-in processing algorithm, a large scale integration (LSI) or a field programmable gate array (FPGA).

The processor 120 may acquire an image including at least one of handwritten text and printed text.

The image including at least one of handwritten text and printed text may be an image acquired by a camera or an image including text input on a display. Alternatively, the image may be a captured image of a screen on the display.

For example, the processor 120 may recognize text included in an image photographed by the camera and text input by a hand touch or a pen touch on the display. Also, the processor 120 may recognize text included in an image that captures a screen displayed on the display.

The processor 120 may identify each of text line regions in the image through image processing.

According to an embodiment, the processor 120 may binarize the text region from the image, and may perform image processing by a correction processing with respect to the binarized text region.

The binarization may be an operation of distinguishing the text region from the rest of regions. In other words, the processor 120 may perform a binarization operation that identifies the text region in the image and distinguish the text from the rest of the regions.

Correction processing may include at least one of removal of a slope, a height standard and a skeletonization with respect to the text region.

For example, the processor 120 may remove a slope such that the slope of a text line that is inclined 30 degrees from the horizontal plane is 0 degrees, and perform correction to standardize each text height uniformly.

The skeletonization is an operation in which pixels forming a text are densely composed of pixels of the same color. For example, when pixels forming a consonant "B" is black, and all pixels forming the "B" may not be composed of black when the "B" is enlarged. For example, "B" written by a pencil at a low pressure are dim such that not all pixels forming the "B" are composed of black. To clarify this, the processor 120 may correct all the colors of the pixels forming the "B" to black. Through the skeletalization work, the processor 120 may express and recognize the corresponding text clearly. For example, the processor 120 may provide a pixel that forms text as a black pixel and a pixel indicating the remaining regions as a white pixel through skeletalization.

The processor 120 may identify each of text line regions in the text region corrected through the image processing described above.

When the text lines included in the image on which the image processing has been performed are plural, the processor 120 may individually identify each of text line regions to increase a text recognition rate.

For example, the processor 120 may calculate an average value of a standardized text-height through image processing, and apply a horizontal line of the calculated average height and horizontal lines spaced apart with equal intervals in vertical directions to the text line region, based on and the horizontal line of the average height, to identify the text line. In other words, the processor 120 may apply three lines to the text line region and identify text spanning three lines as one text line. This will be described in detail in FIG. 4 to be described later.

The processor 120 may identify a region including the identified text line as a plurality of vertical blocks, and calculate a probability of text estimated in each vertical block based on pixel values of each vertical block. The processor 120 may calculate the probability of a character estimated in each vertical block based on multi-dimensional multi-directional long short-term memory (MDMDLSTM). The "multi-directional" may mean that the image input to the electronic apparatus 100 is scanned in various directions, and accordingly, the processor 120 may increase a recognition rate of the text included in the image.

For example, 26 vertical blocks may be applied to a region including a handwritten text "The cat" such that the processor 120 may calculate a probability of a character estimated in each vertical block based on pixel values on each vertical block.

The processor 120 may combine an existence probability of a first character in a first vertical block, an absence probability of the first character in the first vertical block, an existence probability of a second character in a second vertical block, and an absence probability of the second character in the second vertical block to calculate a plurality of probabilities in which at least one of the first and second characters are included in text line regions.

The processor 120 may apply a token passing decoding and preset language model to the plurality of calculated probabilities to acquire a text recognized in the text line region.

The processor 120 may identify a character having a highest probability among characters estimated in each vertical block based on token pass decoding. When the highest probability in a specific vertical block is an absence of a character in the corresponding block, the processor 120 may identify that a text is absent in the corresponding block. Accordingly, the processor 120 may identify a character estimated with the highest probability for each block.

For example, when a probability that no character is included in the first vertical block is highest, the processor 120 may identify that a character is absent in the first vertical block, and when an alphabet "T" has the highest existence probability in a third vertical block, the processor 120 may identify that "T" exists in the third vertical block. This will be described in greater detail in FIG. 5 below.

The processor 120 may combine a candidate text estimated with the highest probability in each vertical block to provide candidate text. For example, the processor 120 may provide "The eat" as candidate text.

The processor 120 may modify the provided candidate text based on the preset language model. For example, the processor 120 may modify "The eat" to "The cat" based on the language model.

The token pass decoding may acquire text in a text line region based on pixel values on each vertical block using the preset language model and a Viterbi algorithm.

The preset language model may be data, a language actually used by a user, for example, a sentence, a phrase, etc. are modeled. The most appropriate text may be identified as a next word of an input text based on a sequentially input text using the language model. According to an embodiment of the disclosure, the preset language model may be an N-Grams language model, but is not limited thereto. Since the Viterbi algorithm and N-Grams language model described above are prior art, detailed descriptions are omitted.

The processor 120 may recognize both handwritten text and printed text when both handwritten text and printed text exist in the image. In addition, when text of different languages are included in the image, the processor 120 may recognize the text included in the image by identifying languages of each text.

The processor 120 may provide the identified text through the process described above. For example, the processor 120 may provide the identified text on a display or recognize the meaning of the identified text to perform an operation corresponding thereto.

In other words, the processor 120 may identify a function related to the recognized text and execute the identified function.

For example, when the identified text is "wake-up at 6 am," the processor 120 may set an alarm at 6 am. Alternatively, when the identified text is "Meeting with AAA at 2:00 on September 25", the processor 120 may register a schedule, meeting with AAA at 2:00 on September 25 on a scheduler.

In addition, when the identified text is "shopping list: egg, milk, apple, bread", the processor 120 may recognize this as a shopping list and store "shopping list: egg, milk, apple, bread" in a notepad.

FIGS. 2A and 2B are block diagrams illustrating a configuration of an electronic apparatus according to an embodiment of the disclosure.

According to FIG. 2B, an electronic apparatus 100 includes a storage 110, a processor 120, a communicator 130, a camera 140 and a display 150. The elements of FIG. 2B overlapped with the elements of FIG. 2A will not be specifically explained below.

The storage 110 may be implemented as an internal memory such as a ROM, RAM, or the like included in the processor 120 or may be implemented as a memory separate from the processor 120. The storage 110 may be implemented in the form of a memory embedded in the electronic apparatus 100 according to a data storage usage, or may be implemented in a form of a memory detachable from the electronic apparatus 100. For example, data for driving the electronic apparatus 100 may be stored in a memory embedded in the electronic apparatus 100, and data for expanding the electronic apparatus 100 may be detachable from the electronic apparatus 100. Meanwhile, the memory embedded in the electronic apparatus 100 may be implemented in the form of a non-volatile memory, a volatile memory, a hard disk drive (HDD), a solid state drive (SSD), or the like.

The processor 120 may include, for example, a CPU 121, a ROM (or a non-volatile memory 143) in which a control program for controlling the electronic apparatus 100 is stored and a RAM (or volatile memory) used to store data input from outside of the electronic apparatus 100 or used as a storage region corresponding to various operations performed in the electronic apparatus 100.

The processor 120 may execute an operating system (OS), programs, and various applications stored in the storage 110 when a predetermined event occurs. The processor 120 may include a single core, a dual core, a triple core, a quad core, and core of a multiple thereof.

The CPU 121 may access the storage 110 to perform a booting sequence using an operating system (OS) stored in the storage 110. In addition, the CPU 143 may perform various operations using various programs, content, data, etc. which are stored in the storage 110.

The communicator 130 may communicate with an external apparatus. The text included in the image may be recognized by the processor 120 by receiving the image containing the text from the external electronic apparatus through the communicator 130. Also, the text included in the image input on the electronic apparatus 100 may be recognized and text or information related to the text recognized as an external electronic apparatus may be provided through the communicator 130.

For example, the communicator 130 may perform wireless communication with the external electronic apparatus by various communication schemes such as Bluetooth (BT), wireless fidelity (WI-FI), Zigbee, infrared (IR), serial interface, universal serial bus (USB), near field communication (NFC), or the like.

Specifically, when a preset event occurs, the communicator 130 may operate in an interoperation state by performing the communication according to a predefined communication method. Herein, the "interoperation" may indicate every state in which the communication is available, including, for example, operation to initialize the communication between the electronic apparatus 100 and the external electronic apparatus, operation to form the network, operation to perform the device pairing, and so on. For example, device identification information of the external apparatus may be provided to the electronic apparatus 100. As a result, a pairing process between two apparatuses may be performed. For example, when a preset event occurs in the electronic apparatus 100 or the external electronic device, the interoperation state may be implemented by searching surrounded devices and performing the pairing with the searched device through Digital Living Network Alliance (DLNA).

The camera 140 may photograph and acquire an image including at least one of handwritten text and printed text.

The display 150 may be implemented with various types of displays such as a liquid crystal display (LCD), an organic light emitting diode (OLED), a liquid crystal on silicon (LCoS), a digital light processing (DLP), a quantum dot (QD) display panel, or the like.

The display 150 may be implemented in the form of a touch screen that forms a mutual layer structure with a touch pad. The display 150 may be used as a user interface (not illustrated) in addition to an output device. Herein, the touch screen may detect not only the touch input location and region, but also the pressure of the touch input.

Accordingly, text input on the display 150 by a hand touch or a pen touch may be recognized by the processor 120.

Figure 3:
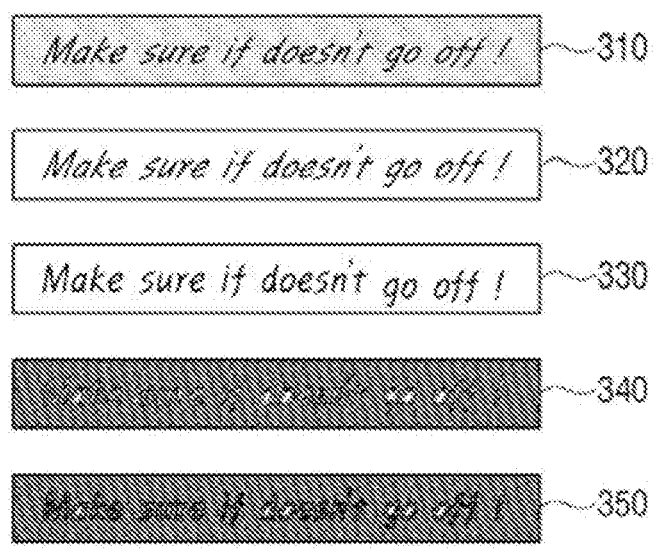
FIG. 3 is a view illustrating an image processing according to an embodiment of the disclosure.

FIG. 3 is a view illustrating an image processing according to an embodiment of the disclosure.

Referring to FIG. 3, the electronic apparatus 100 may perform image processing to more clearly express text included in the image.

An original image 310 may be input to the electronic apparatus 100 through various methods. For example, text may be photographed by the camera 140 or may be input by a hand touch or a pen touch on the display 150 of the electronic apparatus 100, or an original image including text may be received from the other electronic apparatus.

The electronic apparatus 100 may binarize a text region from the image, and perform image processing by a correction processing with respect to the binarized text region.

The binarization may be an operation of distinguishing the text region from the rest of the region. In other words, the electronic apparatus 100 may identify a text region in the image and perform the binarization operation to distinguish the text from the rest of the region.

The correction processing may include at least one of a gradient removal 330, a height standarization 340, and a skeletonization 350 with respect to the text region.

For example, it may remove the gradient so that a gradient of a text line inclined 30 degrees from a horizontal plane is 0 degrees, and perform a correction to standardize the height of each text constant.

The skeletonization is an operation in which pixels forming a text are densely composed of pixels of the same color. For example, when pixels forming the consonant "B" are black, not all pixels forming the "B" may be composed of black when the "B" is enlarged. For example, "B" written by a pencil at a low pressure are dim such that not all pixels forming the "B" are composed of black. To clarify this, the electronic apparatus 100 may perform the correction processing on all the colors of the pixels forming the "B" to be black. Through the skeletalization work, the electronic apparatus may clearly express and recognize the corresponding text. For example, the electronic apparatus 100 may provide a pixel which forms text as a black pixel and pixels indicating the remaining regions as white pixels through the skeletalization.

FIG. 4 is a view illustrating an operation of identifying each of text line regions according to an embodiment of the disclosure.

When text lines included in an image 410 on which the image processing has been performed are plural, the electronic apparatus 100 may individually identify each of text line regions to increase a text recognition rate.

For example, the electronic apparatus 100 may calculate an average value of a standardized text-height through image processing, and apply a horizontal line of the calculated average height and horizontal lines spaced apart with equal intervals in vertical directions to the text line region, based on and the horizontal line of the average height, to identify the text line. In other words, the electronic apparatus 100 may apply three lines to the text line region and identify text spanning three lines as one text line.

For example, according to FIG. 4, the electronic apparatus 100 may identify "pleasure and pain will", "give you a complete" and "account to the system" as separate text lines.

The electronic apparatus 100 may independently identify a first text line 430 only. When each of text line regions is not individually identified, the text recognition rate of the electronic apparatus 100 may be reduced.

For example, when each of text line regions is not individually identified, a second text line may interfere with a text recognition of the first text line such that the electronic apparatus 100 may incorrectly recognize the first text line.

Figure 5:
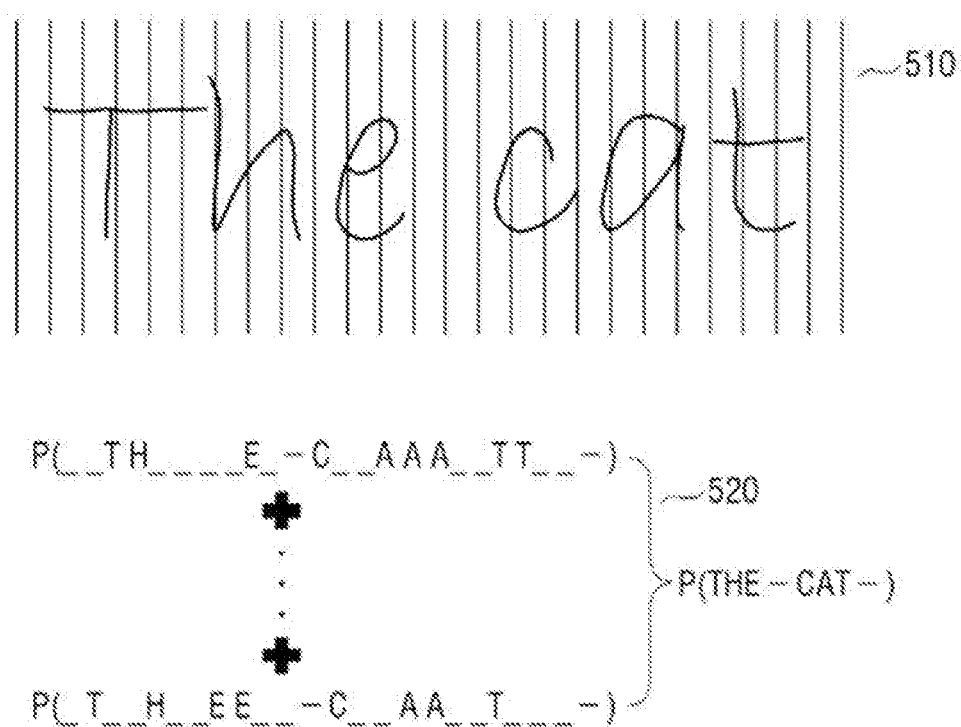
FIG. 5 is a view illustrating an operation of calculating a probability of text estimated in each vertical block according to an embodiment of the disclosure.

FIG. 5 is a view illustrating an operation of calculating a probability of text estimated in each vertical block according to an embodiment of the disclosure.

According to FIG. 5, the text region 510 may be text on which image processing has been performed.

The electronic apparatus 100 may identify a region including the identified text line as a plurality of vertical blocks, and calculate a probability of text estimated in each vertical block based on pixel values of each vertical block.

According to FIG. 5, 26 vertical blocks are applied to a region including a handwritten text "The cat" such that the electronic apparatus 100 may calculate the probability of text estimated in each vertical block based on pixel values on each vertical block.

The electronic apparatus 100 may combine an existence probability of a first character in a first vertical block, an absence probability of the first character in the first vertical block, an existence probability of a second character in a second vertical block, and an absence probability of the second character in the second vertical block to calculate a plurality of probabilities in which at least one of the first and second characters are included in text line regions.

For example, when a probability that no character is included in the first vertical block is highest, the electronic apparatus 100 may identify that text is absent in the first vertical block, and when an existence probability of the alphabet "T" is highest in a third vertical block, the processor 120 may identify that "T" exists in the third vertical block. The electronic apparatus 100 may identify and combine characters which exist or are absent with the highest probability in each vertical block.

The electronic apparatus 100 may identify a plurality of probabilities according to 520 for each vertical block to identify a character having the highest probability in each vertical block.

The electronic apparatus 100 may apply a token passing decoding and preset language model to the plurality of calculated probabilities to acquire a text recognized in the text line region.

The electronic apparatus 100 may identify a character having a highest probability among characters estimated in each vertical block based on the token pass decoding. When the highest probability in a specific vertical block is an absence of a character in the corresponding block, the electronic apparatus 100 may identify that a text is absent in the corresponding block. Accordingly, the electronic apparatus 100 may identify a character estimated with the highest probability for each block. The electronic apparatus 100 may provide a candidate text by combining characters with the highest probability The electronic apparatus 100 may modify the candidate text provided based on the preset language model. For example, when the candidate text identified based on the estimated characters with the highest probability for each block is "The eat", the electronic apparatus 100 may modify the "The eat" to "The cat" based on the language model.

Figure 6:
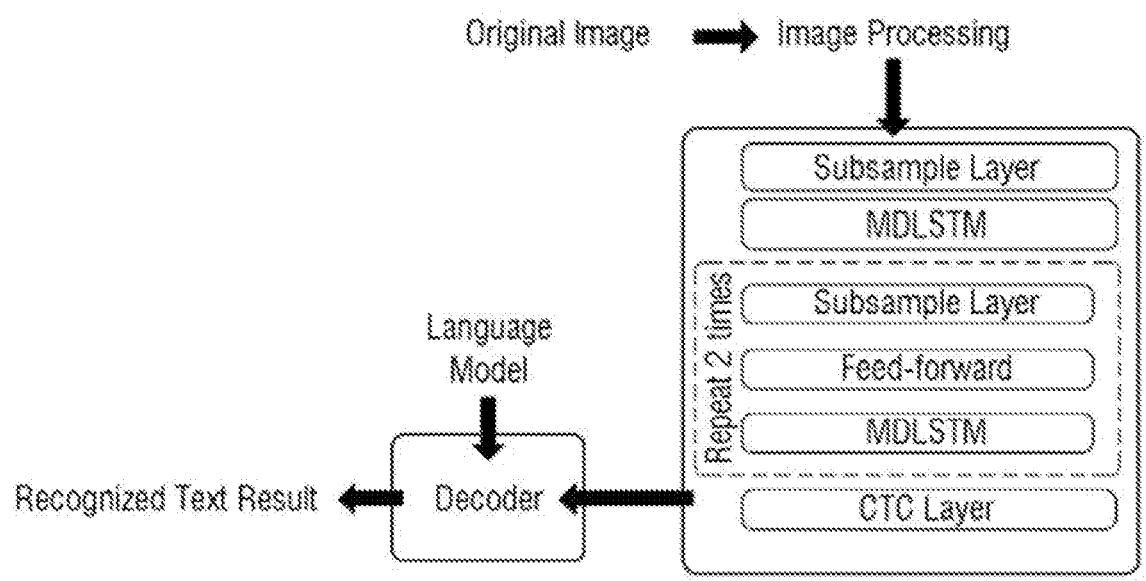
FIG. 6 is view illustrating a process in which text included in an image is recognized according to an embodiment of the disclosure.

FIG. 6 is view illustrating a process in which text included in an image is recognized according to an embodiment of the disclosure.

When an original image is input to the electronic apparatus 100, the electronic apparatus 100 may perform an image processing operation.

Based on the MDLSTM of the electronic apparatus 100, a probability of a character estimated in each vertical block may be calculated based on a pixel value on each vertical block applied to a text region.

Subsample Layer, Feed-forward, MDLSTM and CTC Layer according to FIG. 6 are types of layers used to form a neural network structure. The connectionist temporal classification (CTC) layer may be a type of cost function used only for a training neural network.

The electronic apparatus 100 may repeat the Subsample Layer, Feed-Forward, and MDLSTM two times in an order of Subsample Layer 1, Feed-Forward 1, MDLSTM 1, Subsample Layer 2, Feed-Forward 2, and MDLSTM 2. Through this repetition, overload on the electronic apparatus 100 may be prevented.

The electronic apparatus 100 may calculate a probability of each text included in the original image through the repetition. The probability may refer to a probability calculated in each vertical block in FIG. 5.

The electronic apparatus 100 may identify a character estimated with the highest probability for each vertical block based on token pass decoding. The electronic apparatus 100 may provide candidate text by combining characters estimated with the highest probability.

The electronic apparatus 100 may modify the provided candidate text based on a preset language model. For example, when the candidate text identified based on characters estimated with the highest probability for each block is "The eat", the electronic apparatus 100 may modify the "The eat" to "The cat" based on the language model.

The token pass decoding may acquire text recognized in the text line region using the preset language model and a Viterbi algorithm.

The preset language model may be data, a language actually used by a user, for example, a sentence, a phrase, etc. are modeled. The most appropriate text may be identified as a next word of an input text based on a sequentially input text using the language model. According to an embodiment of the disclosure, the preset language model may be an N-Grams language model, but is not limited thereto. Since the Viterbi algorithm and N-Grams language model described above are prior art, detailed descriptions are omitted.

The electronic apparatus 100 may recognize text modified by the language model.

Figure 7:
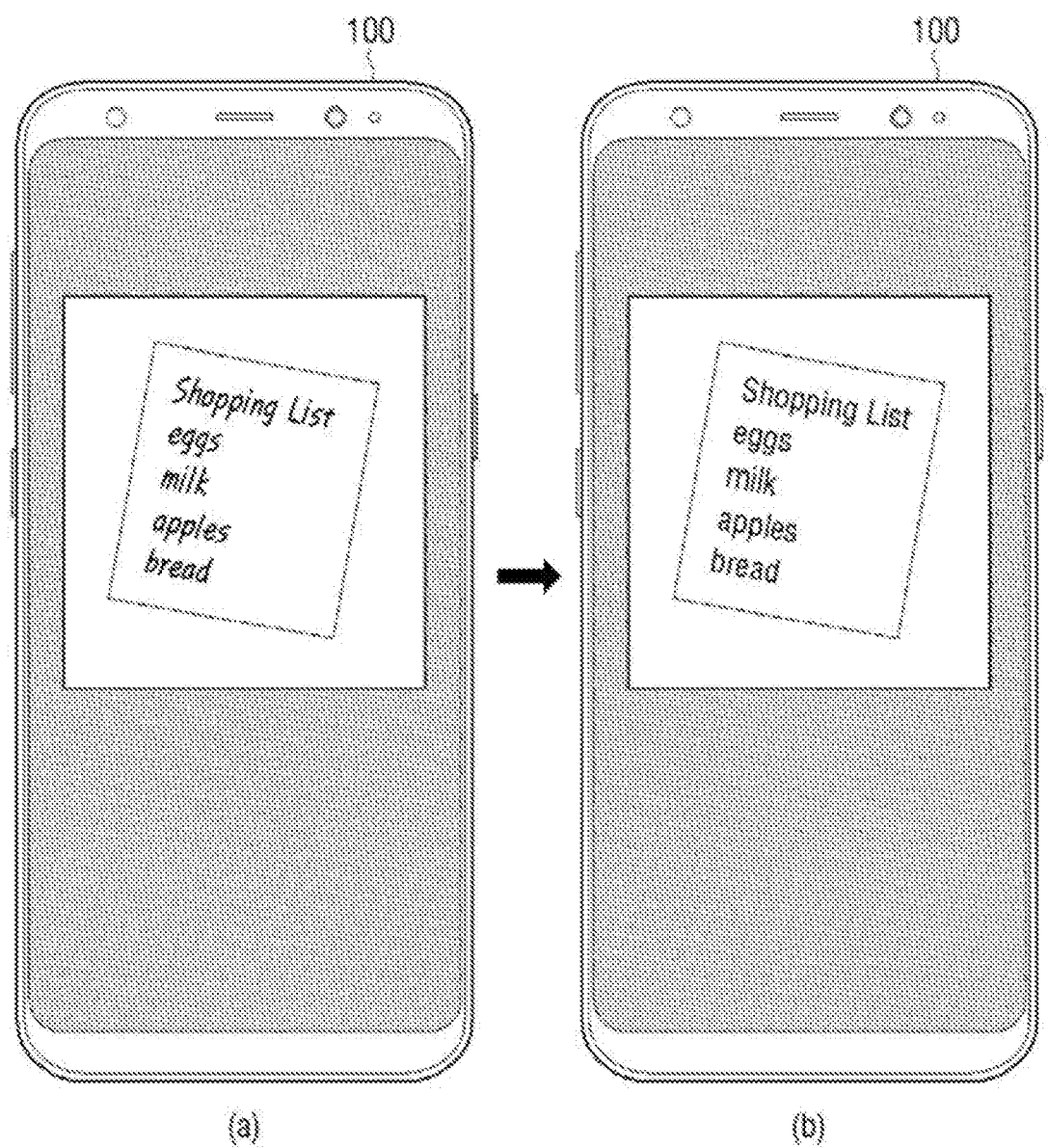
FIG. 7 is a view illustrating an operation in which handwritten text is recognized according to an embodiment of the disclosure.

FIG. 7 is a view illustrating an operation in which handwritten text is recognized according to an embodiment of the disclosure.

FIG. 7A illustrates that at least one of an image photographed by the camera 140, an image input by hand touch or pen touch on the display 150, or handwritten text and printed text included in an image in which an image output on the display 150 is captured is input on the electronic apparatus 100.

The electronic apparatus 100 may identify each of text line regions through image processing including correction processing, and recognize text included in each of text line regions based on a training model.

FIG. 7B illustrates that text included in an image input on the electronic apparatus 100 is recognized. The electronic apparatus 100 may recognize the input text and provide the text as a typed text form as shown in FIG. 7B.

Each step of recognizing text has been described above, so a detailed description thereof will be omitted.

Figure 8:
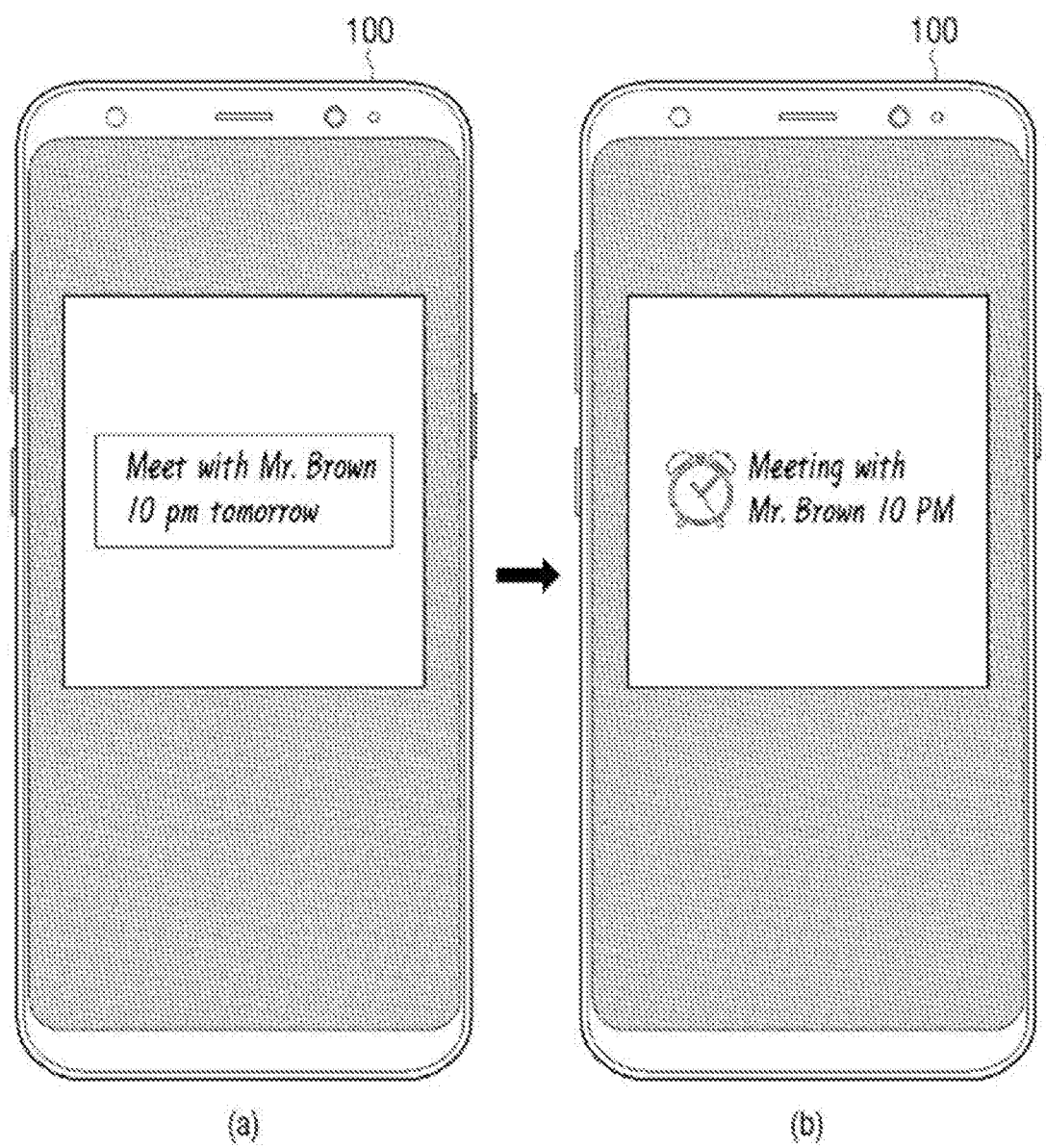
FIG. 8 is a view identifying a function related to a recognized text in an electronic apparatus and illustrating an execution of an identified function.

FIG. 8 is a view identifying a function related to a recognized text in an electronic apparatus and illustrating an execution of an identified function.

According to FIG. 8A, when at least one of handwritten text and printed text is input to the electronic apparatus 100, the electronic apparatus 100 may recognize text based on the operation described above. The electronic apparatus 100 may identify a function related to the recognized text.

According to FIG. 8B, when the identified text is "Meet with Mr. Brown at 10 pm tomorrow", the electronic apparatus 100 may set an alarm titled "Meeting with Mr. Brown at 10 PM". In addition, the electronic apparatus 100 may register a schedule "Meeting with Mr. Brown" at 10 p.m. on a date corresponding to tomorrow on a scheduler.

Figure 9:
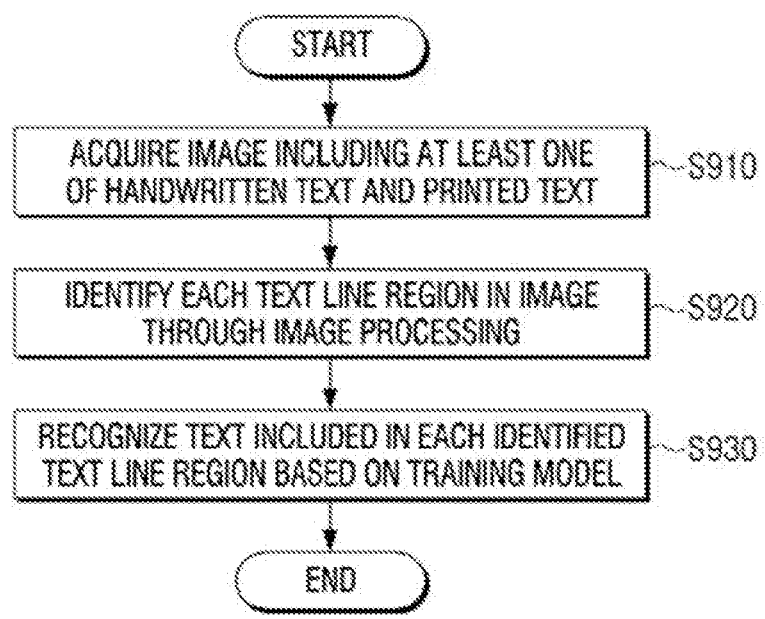
FIG. 9 is a flowchart illustrating a method of controlling an electronic apparatus according to an embodiment of the disclosure.

FIG. 9 is a flowchart illustrating a method of controlling an electronic apparatus according to an embodiment of the disclosure.

According to FIG. 9, the electronic apparatus may acquire an image including at least one of handwritten text and printed text (S910).

The electronic apparatus may identify each of text line regions in the image through image processing (S920).

The electronic apparatus may binarize the text region from the image and perform image processing by a correction processing with respect to the binarized text region.

The correction processing may include at least one of removal of the slope, height standardization and skeletonization with respect to the text region.

The electronic apparatus may identify a region including the identified text line as a plurality of vertical blocks, and calculate a probability of characters estimated in each vertical block based on pixel values of each vertical block.

For example, the electronic apparatus may combine an existence probability of a first character in a first vertical block, an absence probability of the first character in the first vertical block, an existence probability of a second character in a second vertical block, and an absence probability of the second character in the second vertical block to calculate a plurality of probabilities in which at least one of the first and second characters are included in text line regions.

The electronic apparatus may recognize text included in each of text line regions identified based on training model (S930).

The electronic apparatus 120 may apply a token passing decoding and preset language model to the plurality of calculated probabilities to acquire a text recognized in the text line region.

The electronic apparatus may identify a function related to the recognized text and execute the identified function.

For example, when the identified text is "wake-up at 6 am," the electronic apparatus may set an alarm at 6 am. Alternatively, when the identified text is "Meeting with AAA at 2:00 on September 25", the processor 120 may register a schedule, meeting with AAA at 2:00 on September 25 on a scheduler.

In addition, when the identified text is "shopping list: egg, milk, apple, bread", the electronic apparatus may recognize this as a shopping list, and store it in a handwritten text form as it is or change it to a printed text form in a notepad.

A detailed operation of each step has been described above, so a detailed description thereof will be omitted.

At least some of the methods according to various embodiments of the disclosure described above may be implemented in an application form that can be installed in an existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

Various exemplary embodiments described above may be embodied in a recording medium that may be read by a computer or a similar apparatus to the computer by using software, hardware, or a combination thereof. In some cases, embodiments described herein may be implemented by a processor itself. In a software configuration, various embodiments described in the specification such as a procedure and a function may be embodied as separate software modules. The software modules may respectively perform one or more functions and operations described in the specification.

Methods of controlling a display apparatus according to various exemplary embodiments may be stored on a non-transitory computer-readable medium. These computer instructions stored in the non-transitory computer-readable medium may allow a processing operation in accordance with various embodiments described above, when executed by a processor to perform a particular device.

Methods of controlling a display apparatus according to various exemplary embodiments may be stored on a non-transitory computer-readable medium. These computer instructions stored in the non-transitory computer-readable medium may allow a processing operation in accordance with various embodiments described above, when executed by a processor to perform a particular device.

When executed by a processor of a first electronic apparatus, an operation of the non-transitory computer-readable medium storing computer instructions for causing the first electronic apparatus to perform an operation may include acquiring first error related information with respect to a target time interval and second error related information with respect to a reference time interval including the target time interval and time intervals other than the target time interval from error related information of a second electronic device, acquiring frequency information for each number of errors with respect to the target time interval based on the first error related information, frequency information for each number of errors with respect to the target time interval based on the second error related information, and comparing the frequency information with respect to each number of errors with respect to the target time interval and frequency information with respect to each number of errors with respect to the reference time interval to identify the level of error with respect to the target time interval.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the invention. The teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
a storage configured to store a training model of multi-dimensional long short-term memory (MDLSTM); and
a processor configured to acquire an image including at least one of handwritten text and printed text, identify each text line region of a plurality of text line regions in the image through image processing, recognize text included in the identified each text line region based on the training model, and identify a function related to the recognized text and perform the identified function,
wherein the processor is further configured to identify a text line region among the plurality of text line regions as a plurality of vertical blocks and calculate a probability of a character estimated from each of the plurality of vertical blocks based on a pixel value of each of the plurality of vertical blocks,
wherein the processor is further configured to combine an existence probability of a first character in a first vertical block of the plurality of vertical blocks, an absence probability of the first character in the first vertical block, an existence probability of a second character in a second vertical block of the plurality of vertical blocks, and an absence probability of the second character in the second vertical block to calculate a plurality of probabilities in which at least one of the first and second characters is included in the text line region,
wherein the processor is configured to binarize a text region in the image and perform the image processing by correction processing with respect to the binarized text region,
wherein the correction processing includes at least one of removal of a slope and skeletonization with respect to the text region,
wherein the processor is further configured to calculate an average value of a standardized text height through the image processing, apply a horizontal line of the calculated average value of the standardized text height and two horizontal lines spaced apart from the horizontal line to each of the plurality of text line regions in the image, and identify the each text line region of the plurality of text line regions based on the horizontal line and the two horizontal lines,
wherein one line of the two horizontal lines has a first interval from the horizontal line in a first vertical direction, and the other line of the two horizontal line has a second interval from the horizontal line in a second vertical direction, the first vertical direction being opposite to the second vertical direction, and the first interval being a same as the second interval,
wherein the plurality of text line regions in the image include a plurality of text lines, and
wherein the processor is further configured to individually identify each of the plurality of text lines, and identify text spanning the horizontal line and the two horizontal lines in the image as one text line of the plurality of text lines.

2. The apparatus of claim 1, wherein the processor is configured to apply a token passing decoding and a preset language model to the plurality of calculated probabilities and acquire text recognized in the text line region.

3. The apparatus of claim 1, further comprising:
a camera; and
a display,
wherein the image including at least one of the handwritten text and printed text refers to an image obtained by the camera or a handwritten image input on the display.

4. A method of controlling an electronic apparatus storing a training model of a multi-dimensional long short-term memory (MDLSTM), the method comprising:
acquiring an image including at least one of handwritten text and printed text;
identifying each text line region of a plurality of text line regions in the image through image processing;
recognizing text included in the identified each text line region based on the training model; and
identifying a function related to the recognized text and performing the identified function,
wherein the recognizing the text comprises identifying a text ling region of the plurality of text line regions as a plurality of vertical blocks and calculating a probability of a character estimated from each of the plurality of vertical blocks based on a pixel value of each of the plurality of vertical blocks,
wherein the calculating the probability comprises combining an existence probability of a first character in a first vertical block of the plurality of vertical blocks, an absence probability of the first character in the first vertical block, an existence probability of a second character in a second vertical block of the plurality of vertical blocks, and an absence probability of the second character in the second vertical block to calculate a plurality of probabilities in which at least one of the first and second characters is included in the text line region,
wherein the identifying each of the plurality of text line regions comprises binarizing a text region in the image and performing the image processing by correction processing with respect to the binarized text region,
wherein the correction processing includes at least one of removal of a slope and skeletonization with respect to the text region,
wherein the identifying the each text line region comprises calculating an average value of a standardized text height through the image processing, applying a horizontal line of the calculated average value of the standardized text height and two horizontal lines spaced apart from the horizontal line to each of the plurality of text line regions in the image, and identifying the each text line region of the plurality of text line regions based on the horizontal line and the two horizontal lines,
wherein one line of the two horizontal lines has a first interval from the horizontal line in a first vertical direction, and the other line of the two horizontal line has a second interval from the horizontal line in a second vertical direction, the first vertical direction being opposite to the second vertical direction, and the first interval being a same as the second interval,
wherein the plurality of text line regions in the image include a plurality of text lines,
wherein the identifying the each text line region comprises individually identifying each of the plurality of text lines by applying the horizontal line and the two horizontal lines to each of the plurality of text line regions in the image, and wherein text spanning the horizontal line and the two horizontal lines in the image is identified as one text line of the plurality of text lines.

5. The method of claim 4, wherein the recognizing the text comprises applying a token passing decoding and a preset language model to the plurality of calculated probabilities and acquiring text recognized in the text line region.

6. The apparatus of claim 1, wherein the correction processing includes the skeletonization with respect to the text region, and wherein the skeletonization is correction processing performed on the text region such that pixels forming text in the text region are densely formed by pixels of a first color, and pixels forming a region other than the text in the text region have a second color different from the first color.

7. The method of claim 4, wherein the correction processing includes the skeletonization with respect to the text region, and wherein the skeletonization is correction processing performed on the text region such that pixels forming text in the text region are densely formed by pixels of a first color, and pixels forming a region other than the text in the text region have a second color different from the first color.

* * * * *